United States Patent [19]

Dewey

[11] Patent Number: 4,634,309
[45] Date of Patent: Jan. 6, 1987

[54] KNOCK-DOWN FITTINGS

[75] Inventor: Dave Dewey, London, United Kingdom

[73] Assignee: Unerman Greenman Berger Limited, England

[21] Appl. No.: 795,927

[22] Filed: Nov. 7, 1985

[51] Int. Cl.⁴ ............................................... B25G 3/00
[52] U.S. Cl. ................................. 403/407.1; 403/324; 403/231
[58] Field of Search ..................... 403/379, 155, 407.1, 403/324, 403, 378, 319, 231

[56] References Cited

U.S. PATENT DOCUMENTS 4,292,003  9/1981  Pond .................................. 403/407.1

FOREIGN PATENT DOCUMENTS 801012   5/1936  France ................................ 403/403
2446402  9/1980  France ................................ 403/231
1569925  6/1980  United Kingdom ................ 403/231

Primary Examiner—Andrew V. Kundrat

[57] ABSTRACT

A knock-down fitting to hold together two panels at right-angles to one another comprises a body having projections extending from one side and a peg which is received in a bore in the body. One end of the peg and each projection of the body has barb formations to engage holes pre-drilled in the panels.

In accordance with the invention the other end of the peg received in the bore is toggle-shaped and has a waist engaged on opposite sides by the arms of a bifurcated clip. By acting on the cam surface provided by the waist the clip draws the peg into the bore in the body but the toggle shape of the inner end of the peg allows a degree of lateral tolerance to compensate for minor inaccuracies in the positioning of the holes in the panels.

2 Claims, 4 Drawing Figures

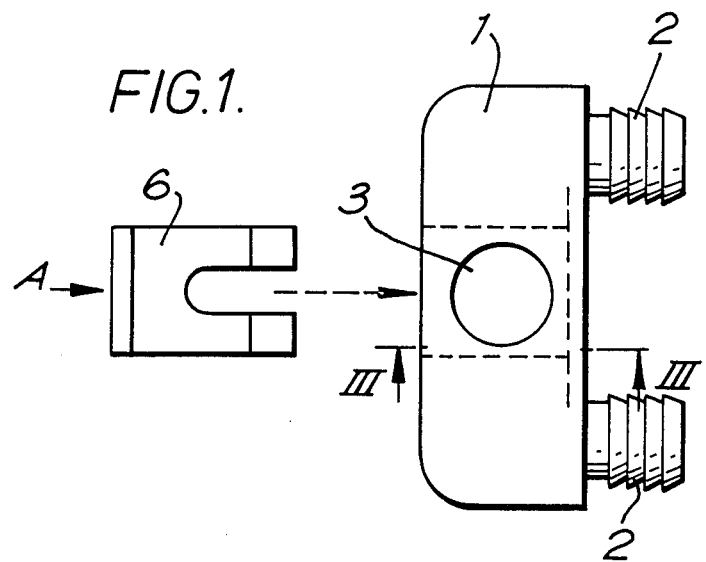
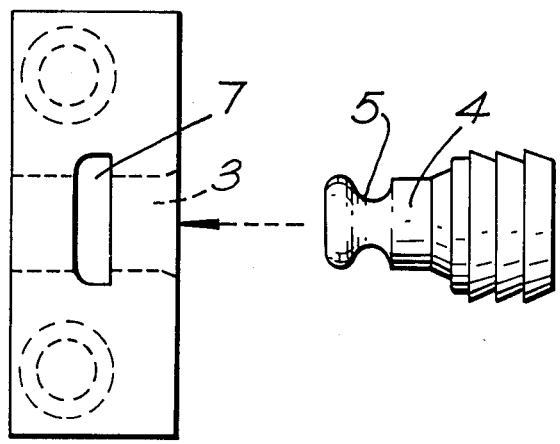

KNOCK-DOWN FITTINGS

BACKGROUND OF THE INVENTION

This invention relates to an improved construction of a so-called "knock-down" fitting which is used for facilitating assembly and connection of component parts of furniture, particularly panels which are to be joined mutually at right angles for constructing cabinets and the like units. Such fittings provide a means whereby two panels can be placed in abutment at 90° and joined by the simple expedient of engaging respective parts of a fitting with pre-drilled holes in the panel surfaces, the parts then being connected together by screws or the like.

The panels are pre-drilled in the factory and a disadvantage of known fittings is that tolerances in the drilling or shaping of the panels have to be absorbed by the fittings, otherwise difficulty occurs in assembly. The fittings have cylindrical projecting parts bounded by a series of concentric teeth which are shaped in the manner of a barb, the projections being tapped into the holes in the panels and retained against withdrawing force by virtue of the barbs.

It is an object of this invention to provide an improved construction of knock-down fitting for joining the corner formed between two panels brought into an angular relationship.

BRIEF SUMMARY OF THE INVENTION

According to one aspect of this invention there is provided a knock-down fitting assembly for securing together two panels at an angle to one another, the fitting comprising a first, body component having means on one side thereof to engage one of said panels and a bore opening to another side thereof at said angle to said one side, and a second, peg component having means at one end thereof to engage the other of said panels, the other end portion of the peg being insertable in the bore and being formed with a cam surface directed toward said one end and there being further provided means movable in the body transversely of the bore to engage the cam, thereby to tend to draw the peg inwardly of the bore and prevent its withdrawal.

The particular advantage of such a construction according to this invention is that a drawing force is applied to the peg so as positively to secure it in the bore against longitudinal displacement but at the same time allowing a certain degree of lateral freedom to absorb any tolerances that might exist in the location of the pre-formed engagement means of the respective panels.

Said means movable in the body may comprise a clip which is insertable in an aperture in the body at right-angles to the bore to engage said cam.

Preferably the cam surface is annular and the clip is generally U-shaped to have arms to pass on opposite sides of the peg and both to engage the annular cam surface.

Said cam surface is preferably part of a waist in said other end portion of the peg.

Said other end portion of the peg may have the shape of a toggle.

The peg is preferably formed intermediate its ends with a shoulder which will abut said other side of the body when the peg is fully received in the bore.

Each said means to engage a panel preferably comprises concentric, barb-shaped formations on one or more projections extending from said one side of the body and on said other end of the peg.

Said sides of the body may be at right-angles to one another.

According to another aspect of the invention there is provided a knock-down fitting assembly for securing together two panels at right-angles to one another, each said panel having pre-drilled hole means therein near to an edge thereof, the assembly comprising a first component comprising a generally oblong body having two flat side surfaces at right-angles to one another, a pair of projections extending generally perpendicularly from one of said two flat sides in mutually spaced relation longitudinally of said side, a bore located generally centrally of said body parallel with said one side and opening to the other of said two sides, and an aperture in the body opening to a third side thereof parallel with said one side and transversely intersecting the bore intermediate the ends of the latter, a second component in the form of a peg having a shoulder intermediate its ends, one end portion of the peg being receivable in the bore in the body until said shoulder abuts said other of said two sides thereof, the other end portion of the peg resembling each said projection of the body, said one end portion of the peg having an hourglass shaped waist, and a third component in the form of a bifurcated clip which is insertable in the aperture so that arms thereof engage opposite sides of the waist in said one end portion of the peg when received in the bore, and by a camming action on the surface of the waist presented to said other end portion of the peg tend to draw the peg into the bore until the shoulder abuts said other of said two sides of the body.

BRIEF DESCRIPTION OF THE DRAWINGS

By way of non-limitative example an embodiment of the present invention is illustrated in the accompanying diagrammatic drawings. In the drawings:

FIG. 1 shows the body part of a knock-down fitting from one side with a clip removed, FIG. 2 is a view of the body part looking in the direction of arrow A of FIG. 1 with the peg removed.

DETAILED DESCRIPTION OF A PREFERRED EMBODIMENT

Figure 3:
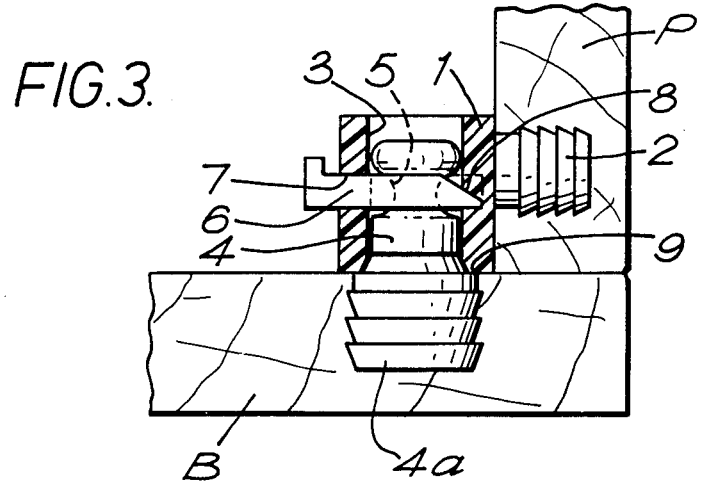
FIG. 3 is a section through the assembled fitting and two panels joined thereby taken on the line III—III of FIG. 1.
Figure 4:
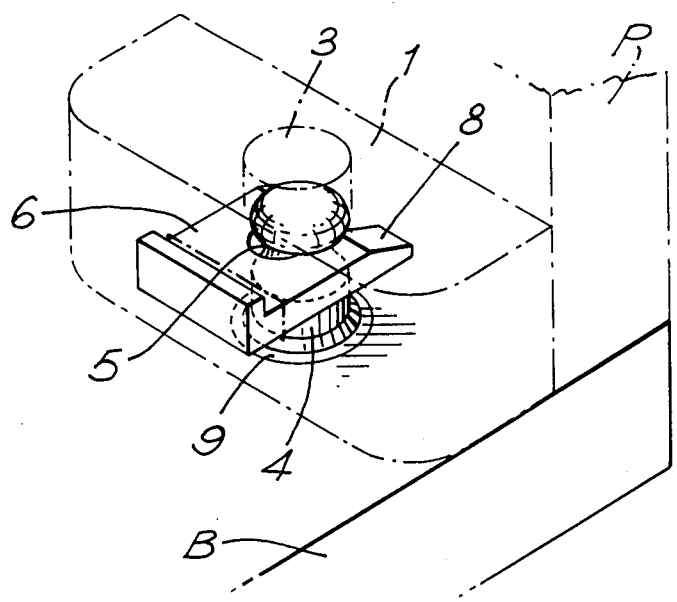
FIG. 4 is a perspective view of the assembled fitting from below and one side, the body portion and the panels being shown in phantom lines.

Referring to the drawings, the knock-down fitting comprises a body part 1 of plastics material with two projections 2 extending from a side face thereof each projection being of cylindrical shape and having a series of concentric saw-tooth or barb-shaped projections to engage with bores provided in one panel P. The projections can be engaged with the panel by tapping same in, the barbs then preventing withdrawal.

A bore 3 is provided in another side of the body extending at right-angles to the axes of the projections 2, the bore being adapted to receive a toggle-shaped end of a peg 4. The other end of the peg 4 is cylindrical and of similar shape to the projections 2. The toggle-shaped end of the peg 4 has a waisted portion 5 which presents a rounded, annular cam surface toward the other end of the peg. The peg 4 is retained within the body part 1 by means of a bifurcated clip 6 which passes through an elongated aperture 7 in the side of the body part remote from the projections 2 thereby to engage opposite sides of the waist 5. The engagement is such that the peg 4 is drawn forcibly against the end of the body part to which the bore 3 opens when the clip is engaged with the waist 5 so as to prevent any longitudinal displacement of the peg and also to draw the peg 4, which is engaged with panel B, into firm engagement with the body 1. Nevertheless the construction shown does provide a degree of lateral freedom and hence when the two panels P and B are brought together any slight misalignment between the positioning of the bores formed in the panels to receive the barbed projections can be accommodated.

The body part 1 may have one, two or more integral projections 2 and also one or more bores 3 may be provided to accommodate respective pegs 4. A nose 8 of the clip 6 may be chamfered as shown to facilitate engagement and the waist 5 is hourglass shaped so that when the clip engages it slight deformation occurs in order to provide a positive inward force to pull the peg 4 firmly into the body. As shown in FIG. 3 the portion 4a of the peg which engages panel B has a shoulder 9 which firmly abuts the face of the body part to which the bore 3 opens.

The construction is simple and involves low cost in manufacture whilst providing a positive coupling which is easy to use and which also enables tolerances to be absorbed.

The clip 6 need not be removable after insertion in the aperture 7. Means may be provided whereby it is retained captive in the body 1.

I claim:

1. A knock-down fitting assembly for securing together two panels at right-angles to one another, each said panel having pre-drilled hole means therein near to an edge thereof, the assembly comprising a first component comprising a generally oblong body having two flat side surfaces at right-angles to one another, a pair of projections extending generally perpendicularly from one of said two flat sides in mutually spaced relation longitudinally of said side, a bore located generally centrally of said body parallel with said one side and opening to the other of said two sides, and an aperture in the body opening to a third side thereof parallel with said one side and transversely intersecting the bore intermediate the ends of the latter, a second component in the form of a peg having a shoulder intermediate its ends, one end portion of the peg being receivable in the bore in the body until said shoulder abuts said other of said two sides thereof, the other end portion of the peg resembling each said projection of the body, said one end portion of the peg having an hourglass shaped waist, and a third component in the form of a bifurcated clip which is insertable in the aperture so that arms thereof engage opposite sides of the waist in said one end portion of the peg when received in the bore, and by a camming action on the surface of the waist presented to said other end portion of the peg tend to draw the peg into the bore until the shoulder abuts said other of said two sides of the body.

2. An assembly as claimed in claim 1, wherein each said projection and said other end portion of the peg has along the length thereof a series of barb-shaped projections for frictional engagement in a respective panel hole means.

* * * * *